United States Patent [19]
Swailes

[11] Patent Number: 6,050,763
[45] Date of Patent: Apr. 18, 2000

[54] PICK-UP TRUCK UTILITY HOOK SYSTEM

[75] Inventor: Steven R. Swailes, Metamora, Mich.

[73] Assignee: DaimlerChrysler Corporation, Auburn Hills, Mich.

[21] Appl. No.: 09/272,480

[22] Filed: Mar. 19, 1999

[51] Int. Cl.$^7$ ................................................. B61D 45/00
[52] U.S. Cl. ........................ 410/107; 410/106; 410/110; 410/111; 410/112
[58] Field of Search .................................. 410/101, 106, 410/107, 109, 110, 111, 112

[56] References Cited

U.S. PATENT DOCUMENTS

| | | | |
|---|---|---|---|
| 2,803,201 | 8/1957 | Johnson et al. | 410/106 |
| 3,298,652 | 1/1967 | Burdick | 410/107 |
| 3,351,356 | 11/1967 | Clark et al. | 410/110 |
| 3,357,670 | 12/1967 | Larson | 410/106 |
| 3,950,010 | 4/1976 | Robertson | 410/110 |
| 4,072,113 | 2/1978 | Thurston | 410/107 |
| 4,396,324 | 8/1983 | Ellis | 410/101 |
| 4,762,449 | 8/1988 | St. Pierre et al. | 410/112 |
| 4,850,769 | 7/1989 | Matthews . | |
| 4,850,770 | 7/1989 | Millar | 410/110 |
| 5,137,324 | 8/1992 | Hershberger . | |
| 5,427,288 | 6/1995 | Trubee . | |
| 5,494,388 | 2/1996 | Stevens . | |
| 5,533,848 | 7/1996 | Davis . | |

*Primary Examiner*—Gary C. Hoge
*Attorney, Agent, or Firm*—Marc Lorelli

[57] ABSTRACT

A utility hook for a pick-up truck is provided. Every Pick-up truck has some sort of bed or cargo carrying area. Typically, the bed is bound by sidewalls that include a vertical exterior wall, a horizontal top portion and a short overhang section. The preferred embodiment of the present invention provides for a base disposed below and attached to the horizontal top portion and between the vertical exterior wall and the short vertical overhang. An attachment structure is pivotally attached to the base via a pivot pin. Attachment structure includes an orientation section and a cargo engagement section disposed on opposite side of the pivot pin. The attachment structure is capable of pivoting such that it is disposed vertically above a plane formed perpendicular to the bottom edge of the short vertical overhang. A stop is also provided to contact the orientation section in order to hold the attachment structure in a defined orientation with respect to said base. The attachment structure is capable of holding grocery bags, packages, tie down straps, cargo nets, and the like.

12 Claims, 2 Drawing Sheets

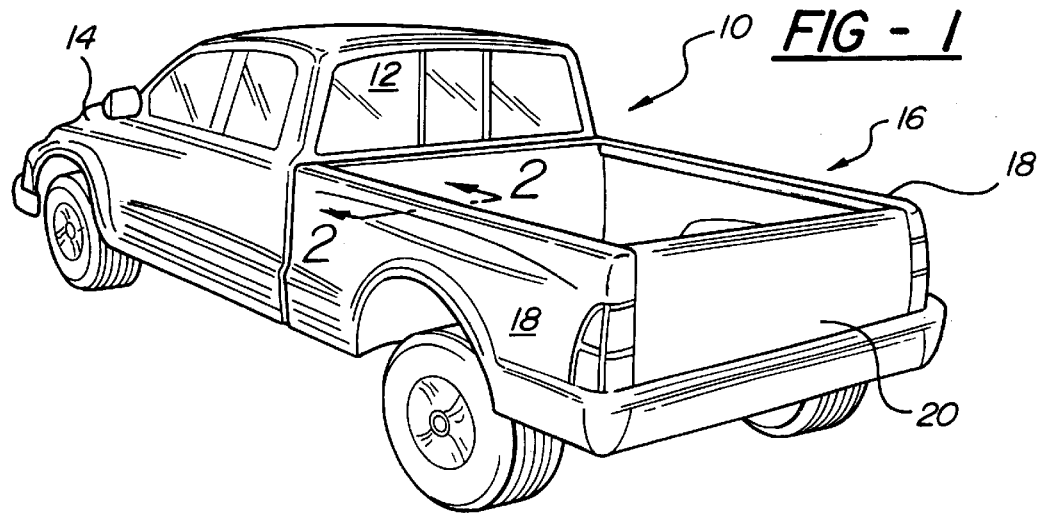
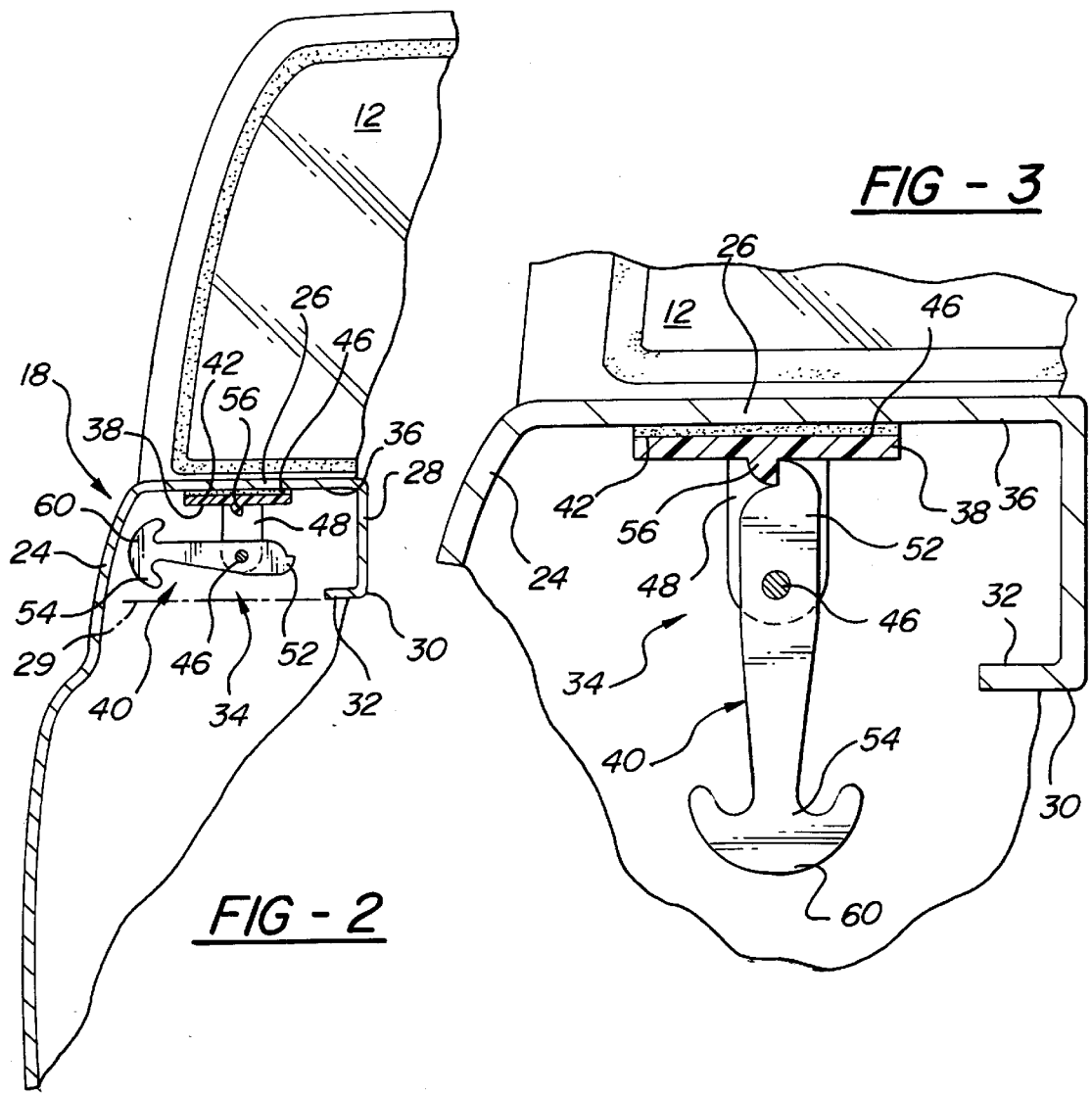

PICK-UP TRUCK UTILITY HOOK SYSTEM

BACKGROUND OF THE INVENTION

1. Technical Field

The present invention relates in general to the field of utility hooks. More particularly, but without restriction to the particular embodiment and/or use which is shown and described for purposes of illustration, the present invention relates to utility hooks that are utilized in the bed of a pick up truck to hold bags, packages, netting, and the like.

2. Discussion

Pick-up trucks typically have a bed for transporting various types of cargo. Often it is desirable to hold the cargo in position in the bed of a pick-up truck. A vast array of systems that may be used to tie down or secure cargo has been utilized in the past. One such design is disclosed in U.S. Pat. No. 5,533,848, titled "Payload Tie-Down System", issued Jul. 9, 1996. This patent discloses a series of S-shaped clipped disposed about the perimeter of the truck bed. These utility hooks can be used to tie down cargo within the bed or may even be used to hold bags having handles, packages, or the like.

Many other designs to hold bags, packages, or tie down structure are known in the art. U.S. Pat. No. 5,137,324, titled "Retaining Cover for an Open Back Truck", issued Aug. 11, 1992, and U.S. Pat. No. 5,427,288, titled "Plastic Grocery-Bag Holder Rack for Use in Vehicles", issued Jun. 27, 1995, disclose alternate methods to provide utility hooks, clips, or the like in a pick-up truck environment.

Although the aforementioned patents are satisfactory in function they are unappealing to the eyes of most people. Ideally, a utility hook system that could be hidden from sight would be preferable. Such a system is needed to hold articles while not detracting from the visual appearance of the truck. U.S. Pat. No. 5,494,388, titled "Hidden Adjustable Tie-Down Device", issued Feb. 17, 1996, claims a "tie-down device which is generally hidden from view and does not detract from the appearance of the truck." (Column 2 Lines 19–21). Although '388 does a satisfactory job in concealing the tie-down device, the device is still readily visible from a number of various angles. There is, therefore, a need to provide a tie down device or a utility hook system for a pick-up truck that is that can be concealed to a further degree in order to further limit the visibility of such a part.

SUMMARY OF THE INVENTION

Accordingly, it is a principal objective of the present invention to provide a utility hook system for a pick-up truck.

It is another objective of the present invention to provide a utility hook system for a pick-up truck that is sufficiently concealed from view.

It is a further objective of the present invention to provide a utility hook system for a pick-up truck that can be pivoted to further conceal the utility hook from view.

In one form, the present invention provides a utility hook for a pick-up truck. Every Pick-up truck has some sort of bed or cargo carrying area. Typically, the bed is bound by sidewalls that include an vertical exterior wall, a horizontal top portion and a short overhang section. The preferred embodiment of the present invention provides for a base disposed below and attached to the horizontal top portion and between the vertical exterior wall and the short vertical overhang. An attachment structure is pivotally attached to the base via a pivot pin. Attachment structure includes an orientation section and a cargo engagement section disposed on opposite side of the pivot pin. The attachment structure is capable of pivoting such that it is disposed vertically above a plane formed perpendicular to the bottom edge of the short vertical overhang. A stop is also provided to contact the orientation section in order to hold the attachment structure in a defined orientation with respect to said base. The attachment structure is capable of holding grocery bags, packages, tie down straps, cargo nets, and the like.

In another form, the present invention includes a base secured to the interior surface of the vertically extending exterior wall adjacent to the horizontal top portion. The invention also includes an attachment structure pivotally attached to the base that can be disposed in a compacted position and an extended position. In the compacted position, the attachment structure is disposed vertically above a plane formed perpendicular to the bottom edge of the short vertical overhang. The extended position is achieved by pivoting the attachment structure about the base until the attachment structure contacts the exterior wall.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is a perspective view of pick-up truck;

FIG. 2 is a cross sectional view along the line 2—2 in FIG. 1 illustrates a utility hook system in its compacted position;

FIG. 3 is a cross sectional view along the line 2—2 in FIG. 1 illustrates a utility hook system in its extended position with a cut away view so that the rubber stop may more fully be seen;

DETAILED DESCRIPTION OF THE PREFERRED EMBODIMENT

Figure 4:
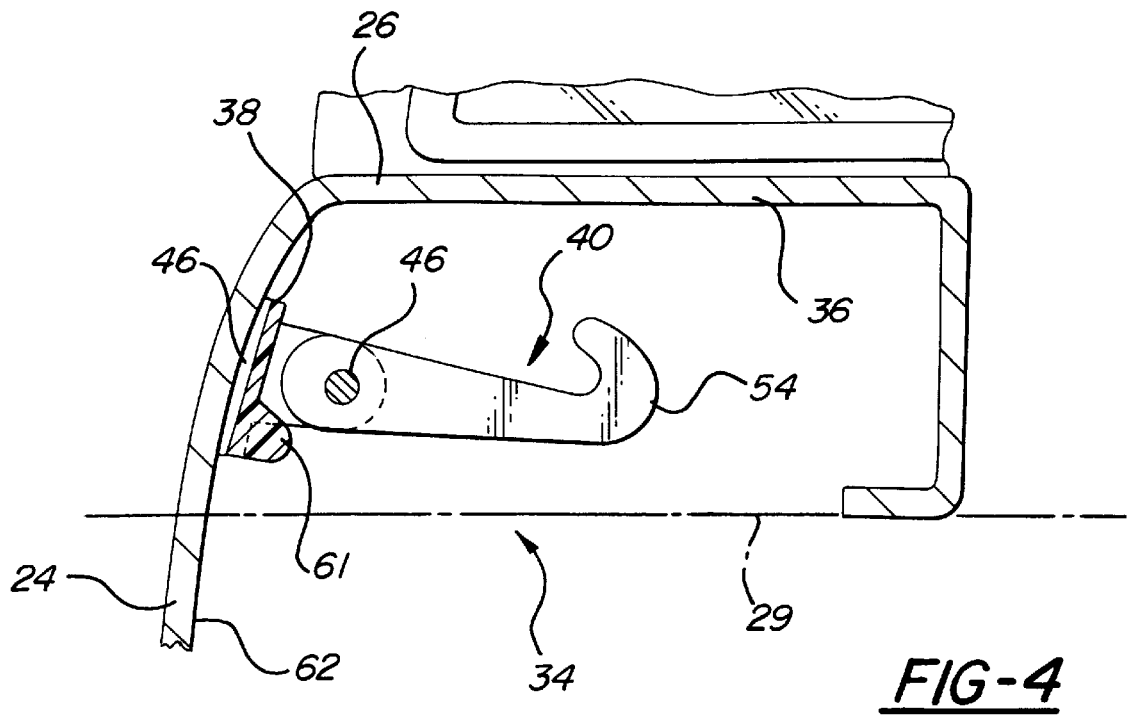
FIG. 4 is a cross sectional view along the line 2—2 in FIG. 1 of an alternate embodiment of the present invention in its compacted position.

Referring now to the drawings, there is depicted a pick-up truck utility hook system illustrating the preferred embodiment of the present invention. Turning first to FIG. 1, a pick-up truck 10 is shown. Typically, pick-up truck 10 includes a passenger cabin 12, an engine compartment 14, and a bed 16. Bed 16 is bounded by sidewalls 18, tailgate 20, floor (not shown), and passenger cabin 12. Bed 16 is typically utilized to carry cargo of various shapes, sizes, and weights.

FIG. 2 illustrates a cross sectional view through the sidewalls 18 of pick-up truck 10. Sidewall 18 is comprised of a vertically extending exterior wall 24 attached to the floor. As exterior wall 24 extends upward it curves until a horizontal top portion 26 is formed. Top portion 26 then curves downward to form a short vertical overhang 28 having a lower edge 30. A short tab 32 typically extends inboard from lower edge 30. A utility hook 34 is attached to the bottom surface 36 of the horizontal top 26 and adapted to fasten cargo thereto. Utility hook 34, is shown in its compacted position in FIG. 2. A utility hook is any structure that can be utilized to attaches articles thereto. Utility hook 34 includes a base 38 and an attachment structure depicted generally as 40. Base 38 includes a flat attachment surface 42 that contacts the bottom surface 36 of the horizontal top 26. Adhesive 46 is disposed between the attachment surface 42 and the horizontal top 26. Downstanding arms 48 and 50 extend from attachment surface 42 and form an inverted U-shaped structure. A pivot pin 46 is provided that interconnects the downstanding arms 48 and 50 of base 38. It should be appreciated that arm 50 is blocked from view in FIG. 2 because it is located directly behind arm 48.

Attachment structure 40 is adapted to be received by the downstanding arms 48 and 50. Attachment structure 40 is pivotally attached to pivot pin 46 and is shown in its compacted position in FIG. 2. Attachment structure 40 includes a orientation section 52 and a cargo engagement section 54 disposed on opposite sides of pivot pin 46. Orientation section 52 is preferably disposed inboard of cargo engagement section 54. As upward or counterclockwise rotational force is applied to orientation section 52, the entire attachment structure 40 pivots about pin 46. This pivotal motion brings the cargo engagement section 54 downward into an operable position for attaching grocery bags, cargo nets, tie straps, and the like. Attachment section 40 can pivot until orientation section 52 contacts stop 56. Preferably, stop 56 is constructed from a rubber material such that contact with stop 56 will position the attachment structure 40 in a defined orientation, as illustrated in FIG. 3. It should be appreciated that stop 56 can establish an operable orientation of the cargo engagement section 54 so that bags, netting, packages, etc. can be easily attached thereto. In this extended position, as illustrated in FIG. 3, the cargo engagement section 54 preferably includes an anchor structure 60 that opens on the inboard and outboard sides of the cargo engagement section 54. It should also be appreciated while in the extended position, an outboard or clockwise rotational force can be applied to the cargo engagement section 54 to allow the utility hook 34 to return to the compacted position as illustrated in FIG. 2. It should further be appreciated that while in the compacted position, the entire utility hook 34 is disposed above vertically above a plane 29 formed perpendicular to the lower edge 30 of the short vertical overhang 28, thereby concealing utility hook 34 from sight of any observer located outside of the vehicle bed 16. It should further be appreciated that any type of formation to engage packages, ropes, or straps could be employed as the cargo engagement section 54, and such formations are within the scope of the present invention.

Figure 5:
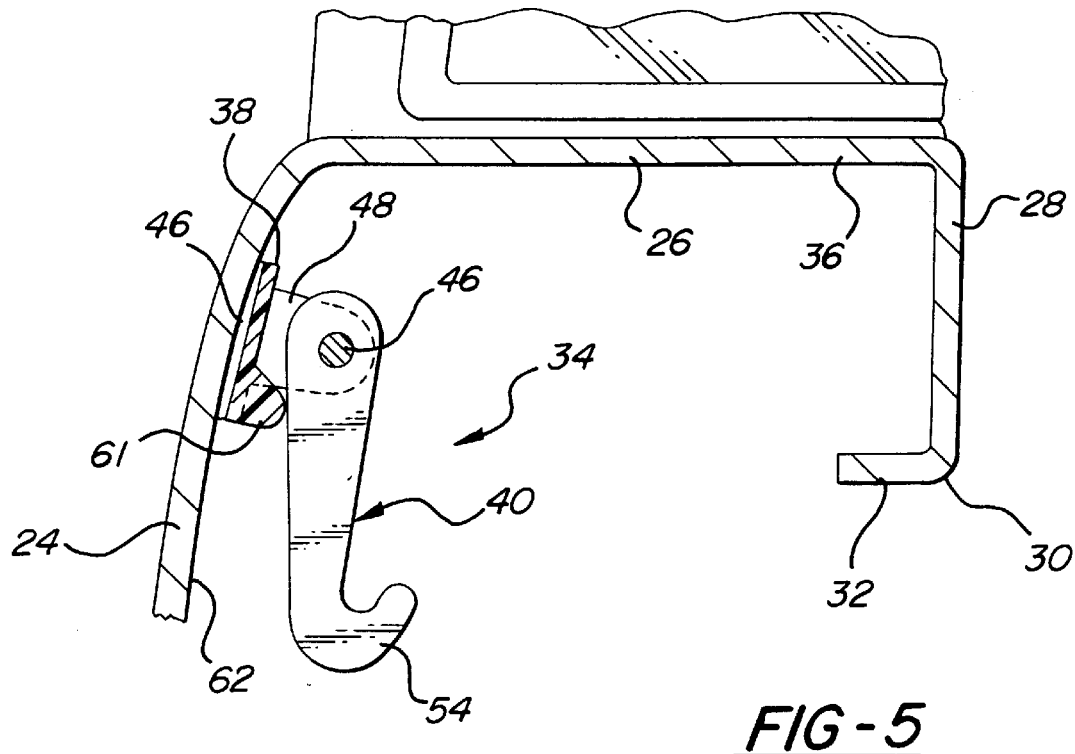
FIG. 5 is a cross sectional view along the line 2—2 in FIG. 1 of an alternate embodiment of the present invention in its extended position.

FIG. 4 is an alternate embodiment of the present invention in the compacted position, such that the entire utility hook is disposed above plane 29. Base 38 is attached to the interior surface 62 of the exterior wall 24 adjacent to horizontal top 26 via adhesive 46. By forcing cargo engagement section 54 clockwise, it pivots about pin 46. The attachment structure 40 can pivot until it contacts the stop 61. The extended arrangement is illustrated in FIG. 5.

While the above description constitutes the preferred embodiment of the invention, it will be appreciated that the invention is susceptible to modification, variation, and change without departing from the proper scope or fair meaning of the accompanying claims.

What is claimed is:

1. In a pick-up truck having a bed including a wall structure, said wall structure having a vertically extending exterior wall, a horizontal top portion with a bottom surface, and a short vertical overhang, the invention comprising:
    a utility hook attached to the bottom surface of the horizontal top portion of the pick-up truck wall structure and extending downward therefrom.

2. The invention as set forth in claim 1, wherein said utility hook includes a base portion and an attachment structure pivotally connected thereto.

3. The invention as set forth in claim 2, wherein said attachment structure includes a orientation section and a cargo engagement section disposed on opposite sides of the pivotal connection to said base portion.

4. The invention as set forth in claim 2, further comprising a stop adapted to contact said orientation section to hold said attachment structure in a defined orientation.

5. In a pick-up truck having a bed including a wall structure, said wall structure having a vertically extending exterior wall, a horizontal top portion with a bottom surface, and a short vertical overhang having a bottom edge, the invention comprising:
    a base disposed below the horizontal top portion and affixed in a stationary relationship with the wall structure, said base also disposed between the vertically extending exterior wall and the short vertical overhang; and
    an attachment structure pivotally attached to said base, said attachment structure disposed below the horizontal top portion and between the vertically extending exterior wall and the short vertical overhang.

6. The invention as set forth in claim 5, wherein said base is secured to the bottom surface of the horizontal top portion.

7. The invention as set forth in claim 5, wherein said base is secured to the interior surface of the vertically extending exterior wall.

8. In a pick-up truck having a bed including a wall structure, said wall structure having a vertically extending exterior wall with an interior surface, a horizontal top portion with a bottom surface, and a short vertical overhang having a bottom edge, the invention comprising:
    a base disposed below the horizontal top portion and between the vertically extending exterior wall and the short vertical overhang;
    a pivot pin attached to said base;
    an attachment structure pivotally attached to said pivot pin, said attachment structure disposed below the horizontal top portion and between the vertically extending exterior wall and the short vertical overhang, said attachment structure including a cargo engagement section and a orientation section disposed on opposite sides of said pivot pin, said attachment structure capable of being rotated about said pivot pin such that said attachment structure is capable of being disposed vertically above a plane formed perpendicular to the bottom edge of the short vertical overhang; and
    a stop disposed to contact said orientation section in order to hold said attachment structure in a defined orientation with respect to said base.

9. The invention as set forth in claim 8, wherein said base is secured to the bottom surface of the horizontal top portion.

10. The invention as set forth in claim 9, wherein said base includes a substantially flat attachment surface that is secured to the top portion of the pick-up truck.

11. The invention as set forth in claim 10, further comprising adhesive disposed between said substantially flat attachment surface of said base and the top portion of the pick-up truck to provide a secure attachment therebetween.

12. The invention as set forth in claim 11, wherein said cargo engagement section includes a anchor section that opens to the inboard and outboard sides thereof adapted for attaching articles thereto.

* * * * *